United States Patent [19]
Ebert
[11] Patent Number: 4,553,299
[45] Date of Patent: Nov. 19, 1985

[54] METHOD FOR INSTALLING A WHIRLPOOL BATH ON AN IN-PLACE BATHTUB

[76] Inventor: Thomas P. Ebert, 1611 Sheffield Ct., Elgin, Ill. 60120

[21] Appl. No.: 522,531

[22] Filed: Aug. 12, 1983

Related U.S. Application Data

[62] Division of Ser. No. 291,818, Aug. 10, 1981, Pat. No. 4,419,775.

[51] Int. Cl.⁴ .................... B21D 53/00; B21K 29/00; B23P 15/26

[52] U.S. Cl. .................... 29/157 R; 29/401.1; 29/407; 29/469; 29/526 R; 408/1 R

[58] Field of Search .................... 29/157 R, 407, 526 R, 29/469, 401.1; 4/541, 542; 408/1 R

[56] References Cited

U.S. PATENT DOCUMENTS

| | | | |
|---|---|---|---|
| 3,254,399 | 6/1966 | Zakuranec | 29/407 |
| 3,585,699 | 6/1971 | Shuttle | 29/407 X |
| 4,240,166 | 12/1980 | Altman et al. | 4/542 |
| 4,359,790 | 11/1982 | Chalberg | 4/541 |

*Primary Examiner*—Charlie T. Moon
*Attorney, Agent, or Firm*—Mathew R. P. Perrone, Jr.

[57] ABSTRACT

A whirlpool system has the air and water mixing systems adjacent to the pump. The air and water mixing system is connected to inlets and outlets within a tub by flexible pipes, preferably—or optionally by semi-flexible or rigid pipes. The outlets or inlets within the tub are preferrably mounted in the tub from the inside of the tub.

2 Claims, 8 Drawing Figures

Fig. 3
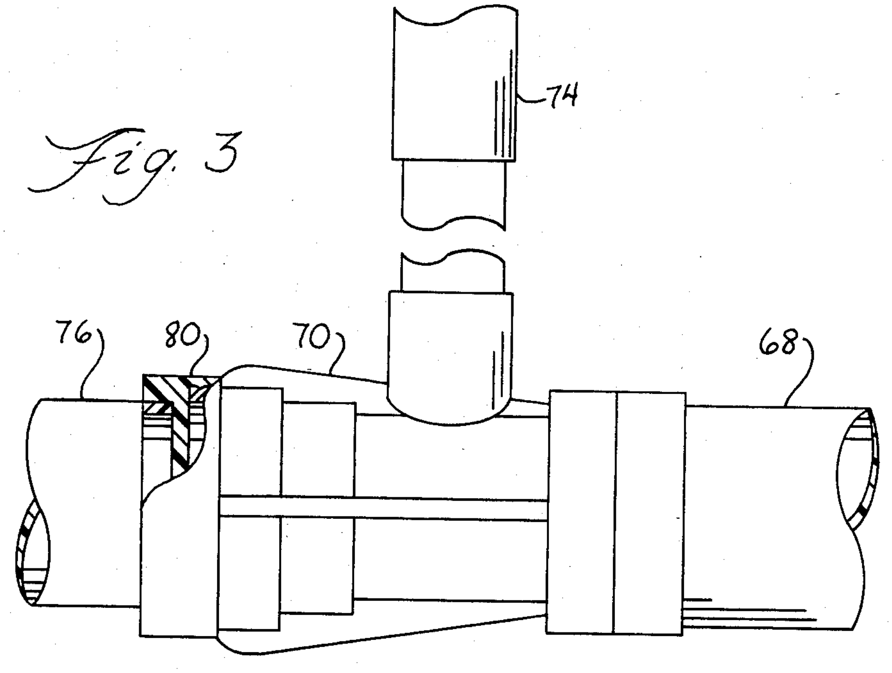
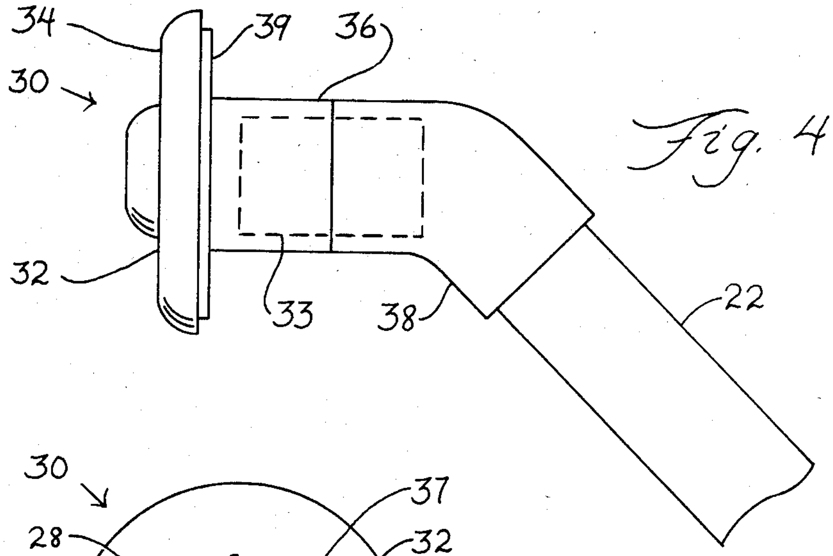
Fig. 4
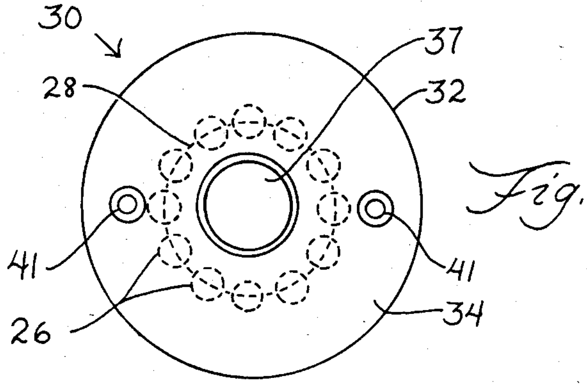
Fig. 5

METHOD FOR INSTALLING A WHIRLPOOL BATH ON AN IN-PLACE BATHTUB

This application is a Division of U.S. patent application Ser. No. 06/291,818, filed Aug. 10, 1981, now U.S. Pat. No. 4,419,775; issued Dec. 13, 1983.

BACKGROUND OF THE INVENTION

This invention relates to baths and more particularly to whirlpool baths.

Many people, after working hard, can be refreshed by hydrotherapy treatment in a whirlpool bath. This refreshing aspect of the whirlpool bath is available to the sedentary person or the athletic person. The whirlpool bath treatment can calm a nervous person, ease the pain of aching muscles, and even sooth sore feet.

Because of these advantages of whirlpool baths, many commercial establishments such as saunas, spas, hotels, or motels are installing whirlpool baths in their rooms. The purpose of such installations is to achieve competitive edges. In order to maximize the competitive edge thus achieved, the whirlpool bath must be simple to install, to operate, and to service.

The current state of the art for installing a whirlpool bath in an existing bathroom requires removal of the old bathtub and installation of a new bathtub specifically designed for use as a whirlpool bath. Such installation requires extensive remodelling and other expense. Thus, the advantages of the whirlpool tend to be outweighed by the expense of installation.

Even if it were possible to install a whirlpool bath in an in-place tub, with the current state of the art the working conditions to achieve the desired structure for the whirlpool bath are too cramped to permit installation or an efficient operation. For this reason, the required outlets and water recirculation points must be installed in a bathtub before it is set in-place. This means, that the bathtub must be predetermined to be a whirlpool, or must be completely removed in order to install the desired whirlpool apparatus followed by subsequent reinstallation of the specially designed tub. Additionally, it is clear that such installing and reinstalling provides for a very complicated and expensive installation and mitigates against such installation on an in-place bathtub without a substantial remodeling and reworking of the bathroom.

Most of the functions of the whirlpool bath require the use of T-shaped fittings. It is these "T" fittings in the cramped quarters of the installed bathtubs which cause most of the difficulties in setting up an in-place bathtub as a whirlpool bath.

Another reason for the difficulty of installing a whirlpool in an in-place tub is the fact that the various outlets for feeding water into the tub and the recirculating tap for recirculating the water back to the pump must use a locknut to hold the apparatus in-place. The locknut cannot be attached from the interior of the tub. In other words, efforts must be made to reach between the walls of the tub to hold the necessary inlet and outlet in position while the locknut is tightened. Such a procedure on an in-place bathtub is extremely difficult—if not impossible. These are the reasons removal of an in-place bathtub is necessary to permit the attachment of the standard whirlpool bath features.

Still, a further difficulty with the installation of whirlpool apparatus in a tub is that a porcelain tends to chip. Yet holes must be made in the tub to achieve the desired installation. It is extremely desireable make those holes without otherwise chipping the tub.

If the tub is a fiberglass tub, holes cannot be tapped into the tub. It is desirable to find a method of mounting the whirlpool fitting therein.

As can be seen from the complications set forth in installing a whirlpool bath, it becomes clear that such an operation is both expensive and complicated. Due to the complexities and expense involved in this operation, it becomes difficult for the consumer to take advantage of the relaxing and helpful qualities of a whirlpool bath.

If a better method of installing whirlpool baths can be found which permits the installation of the whirlpool bath less expensively and more simply, great advantages can accrue by having a whirlpool bath which is such a valuable health apparatus, more available to more people—either commercially or at home.

SUMMARY OF THE INVENTION

Therefore it is an object of this invention to provide a whirlpool bath which can be installed on an in-place bathtub.

A further object of this invention is to provide a whirlpool bath which is simple to install.

A still further object of this invention is to provide a whirlpool bath which is inexpensive to install.

Yet a further object of this invention is to provide a whirlpool bath which avoids the use of T-shaped fittings.

Also an object of this invention is to provide a whirlpool bath which avoids the use of locknuts.

Another object of this invention is to provide a method for drilling an in-place bathtub without chipping the porcelain on the tub.

Still another object of this invention is to provide a method for installing a whirlpool bath in an in-place bathtub.

Yet another object of this invention is to provide a method for installing a whirlpool bath in a fiberglass tub.

A further object of this invention is to provide a method for installing a whirlpool bath without completely remodelling the bath room.

These and other objects of the invention are met by providing a whirlpool bath which has the air intake and venturi connections adjacent to the pump. The venturi is preferrably connected to tub inlets and tub outlets by a flexible pipe, which is capable of being preassembled to the tub inlet or outlet. Rigid or partially flexible pipe with a ninety degree, a forty-five degree or similar angular fitting secured thereto may also be used to connect the inlets and outlets to the pipe and thence to the pump.

BRIEF DESCRIPTION OF THE DRAWING

FIG. 3 is an expanded view of venturi connection 70.

FIG. 4 is an expanded connection of jet inlet 30.

FIG. 5 is a front view of jet inlet 30 shown in FIG. 4.

Throughout the figures of the drawings, when the same part appears in more than one figure, that part continues to have the same number.

DESCRIPTION OF THE PREFERRED EMBODIMENTS

A whirlpool bath of this invention includes a tub, a pump assembly, with the pump assembly connected to inlets and outlets within the tub by means of flexible pipes. Depending on the original tub installation, rigid or partially flexible pipe may also be used.

Flexible Pipe Use

Figure 1:
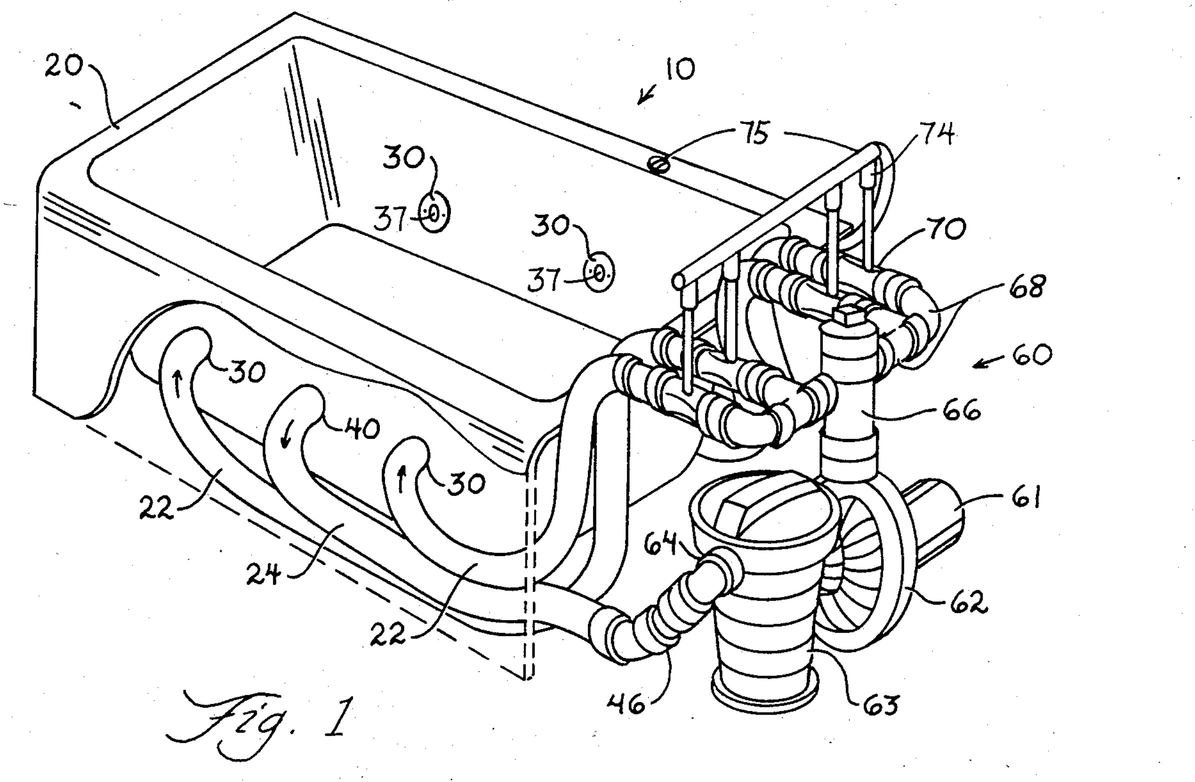
FIG. 1 is a perspective view of whirlpool bath 10 in partial cutaway section.
Figure 2:
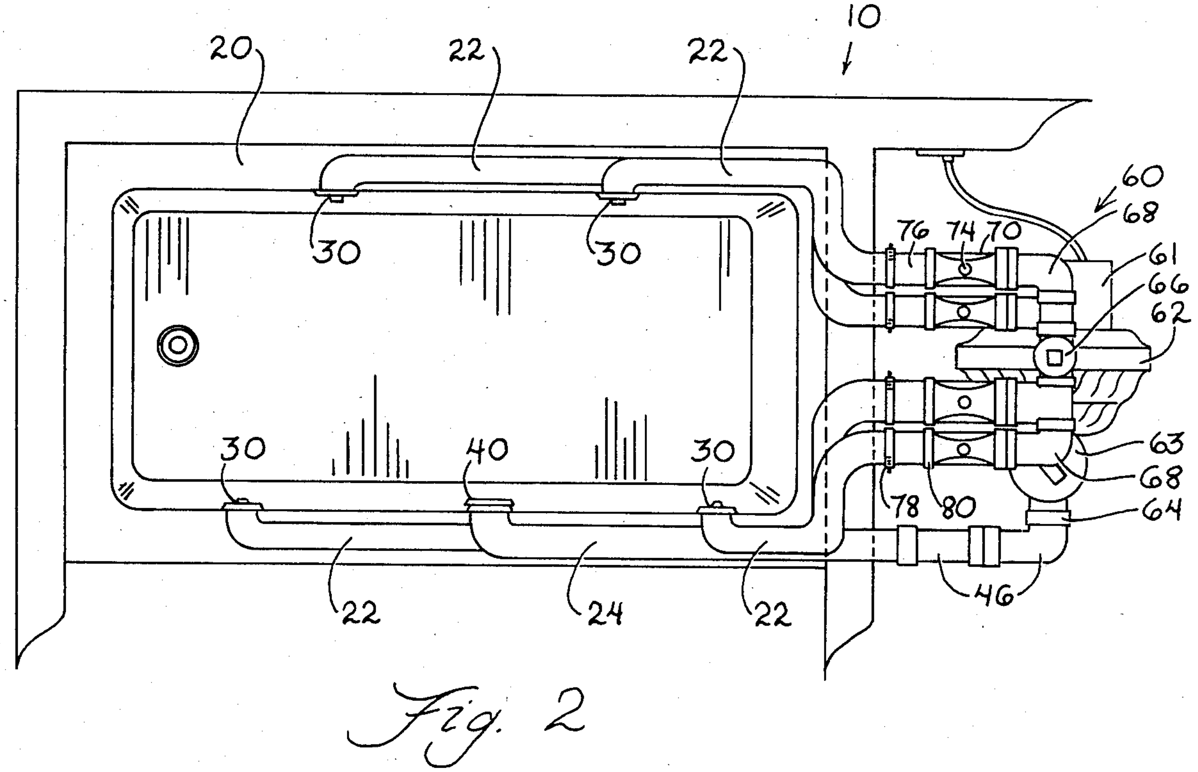
FIG. 2 is a top view of whirlpool bath 10.

Referring now to FIGS. 1 and 2, whirlpool bath 10 includes tub 20 and pump assembly 60. Inlet flexible pipe 22 and outlet flexible pipe 24 connect the pump assembly 60 to the tub 20. In the preferred embodiment shown, there are four inlet flexible pipes 22 and four inlets 30, which achieve the desired results most efficiently.

As shown in FIG. 4, inlets 30 include an inlet cap 32 fitted to an aperture in the tub 20. While inlet cap 32 is a unitary piece, included therein, are a flange 34 and a tube 36, which combine form inlet channel 37. Flange 34 appears on the inside of the tub. Tube 36 is connected in any standard fashion to pipe 22 so that water can pass through pipe 22 into tube 36, through inlet channel 37 into tub 20 with whirlpool action. Channel pipe 33 may be glued into tube 36 in a male-female relationship. The other end of channel pipe 33 is similarly inserted in pipe connector 38. The other end of pipe connector 38 may have inserted therein inlet pipe 22. The pipe connector 38 may have a forty-five degree bend as shown or a ninety degree bend. This use of inlet pipe connector 38 with flexible inlet pipe 22 thereby connects tube 36 to flexible pipe 22 in order to permit water to pass therethrough into tub 20 with whirlpool action. Gluing is the preferred method of securing the pipes and tubes. With such gluing, inlets 32 and outlet 40 can be secured to pipes prior to installation in the tub 20.

As shown in FIGS. 4 and 5, within the flange 34, are mounting apertures 41. Through these mounting apertures 41, screws are placed in threaded relation with tub 20 thereby forming a water tight seal of the flange 34 with tub 20. Seal 39 may be placed behind flange 34 and held in water tight contact with tub 20 due to screws placed through mounting apertures 41 in threaded relation with the tub 20. With the inlet hose 22 thus assembled to the inlet cap 32 and the outlet hose 24 thus assembled to the outlet 40 in such a secure mounting, the necessity for the "T" fittings is eliminated.

Figure 6:
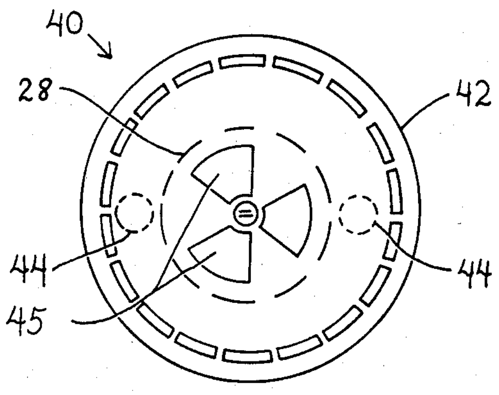
FIG. 6 is a front view of recirculating outlet 40.

Outlet cap 42 as shown in FIG. 6 is a cover for an outlet, having an outlet channel 45 through which water passes into outlet pipe 24 in order to be recirculated to pump assembly 60, similar to, but larger in diameter by up to two (preferably 1½) times than inlet tube 36. The outlet is connected to outlet pipe 24 in fashion similar to that of inlet pipe 22 such as shown in FIG. 4. The recirculating outlet 40 includes outlet cap 42. Outlet mountings 44 provide a means for securing the outlet cap 42 to the side of the tub 20. The outlet pipe 24 is connected to the outlet cap 42 in a substantially similar fashion as the inlet pipes 22 connected to the inlet cap 32. At the other end, the outlet pipe 24 is connected to the pump inlet 64.

Careful installation is required to avoid chipping of a porcelain tub during installation of the whirlpool bath. As a result of this invention, it is now known how to best avoid such chipping of the tub. This procedure applies to both the inlet cap 32 and the outlet 40, but is described from the inlet standpoint for the purposes of this invention. Firstly, inlet cap 32 is used to mark the appropriate spot or location as a template. Both inlet 30 and outlet 40 are used to determine the appropriate positioning. A level positioning for the inlets and outlets is preferred. After the positions are marked, a small masonry drill bit is used to make a guide hole centrally located in the inlet by drilling through the porcelain to the metal. Then a plurality of holes are drilled through the porcelain to the metal on the edge of tube 36 outline, which appears on the tub 20 (as shown in FIG. 5). At that point, an aperture in tub 20 may be cut for receiving inlet cap 32. The plurality of small holes 26 drilled just through the porcelain permits the inlet and outlet aperture 28 to be cut without chipping the porcelain. This procedure is repeated for as many inlets or outlets as may be desired.

After the holes are cut in the tub 20, the pipe with inlets and outlets glued or otherwise attached thereto may be fed through the holes from the inside of tub 20. The flexible inlet pipe 22 or outlet pipe 24 are fed through the inside of the tub 20 to pump assembly 60.

Customarily there is closet space or other space adjacent to the tub 20 for storage of pump assembly 60. If there is no such space available, the pump assembly 60 may be placed anywhere the flexible pipe may reach.

Referring now to FIGS. 1 and 2, pump assembly 60 is a standard apparatus known in the art. Pump assembly 60 includes a motor 61 operatively connected to pump 62 which is in turn operatively connected to filter 63. On filter 63 is water inlet 64 which receives water from tub 20 via outlet pipe connection 46. Pump outlet 66 is on pump 62 and has connected thereto an outlet divider 68. This outlet divider 68 can provide for more than one attachment to permit the water to be fed to the four different inlets 32. Of course, more or less than four inlets are permitted. The shown four tub inlets 30 are a preferred structure from the standpoint of pump size and efficiency, and of user comfort.

As above stated and shown in FIGS. 1 and 2, the outlet divider 68 has four available connections for inlet pipe 22. These connections are made through venturis 70 as shown in FIG. 3. Venturis 70 permit water to pass through inlet pipe 22 and through inlet channel 37, and are a standard venturi commonly available. The venturis 70 may be attached with standard threaded devices and or may be glued to to divider outlets 68 and flexible pipe 22. In FIG. 3, the venturi 70 mates in male-female relation with threaded connector 80, while pipe tube 76 is glued in male-female relationship with the other end of connector 80. Inlet pipe 22 is then glued into pipe tube 76 in a water-tight relationship. Pipe tube 76 may also be eliminated and direct gluing be used between inlet pipe 22 and venturi 70.

Connected to the venturi 70 is the air intake 74. Between the air intake 74 and the venturi 70, water is mixed with air and forced into inlet flexible pipe 22. From that point, the water passes through the flexible pipe 22, through the inlet cap 32, and into tub 20.

Air intake 74 can receive air to be mixed with water in any suitable fashion. The flow of water through venturi 70 may suck air into the venturi 70. An air blower 81 (shown in FIG. 8) may be connected to the air intake in any suitable fashion. The air blower 81 may be situated in any suitable place, and may also be adjustable as to the amount of air fed to air intake 74. One blower is customarily connected to all four of the air intakes 74 in the preferred model of the whirlpool bath 10. If the blower is below the water line, a standard Harvard loop and check valve must be used to prevent water form getting into the air blower. The check valve and Harvard loop are well known in the plumbing art, but have not heretofore been used in a device similar to the invention herein disclosed and claimed.

Figure 7:
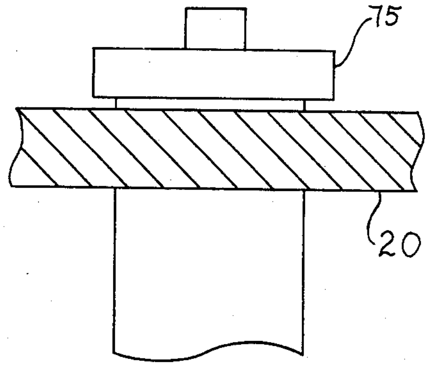
FIG. 7 is a side view of tub 20 with air control 75 mounted therein.

As shown in FIGS. 1 and 7, a control valve 75 may be mounted on the tub 20 above the waterline and be used to feed air to the air intake 74. The valve 75 adjusts the amount of air mixed with the water and gives the user of the whirlpool control of the air and water mixture. The control valve 75 is connected to air intake 74 in a standard fashion and permits air to enter air intake 74 only through valve 75. Thus it may be seen that there are a number of methods of mixing air with water and controlling the whirlpool effect.

This whirlpool apparatus and method may also be used with a fiberglass tub, with only a slight modification. When a fiberglass tub is having such an installation, it is not possible to tap screws therein for the installation of the inlets and the outlets. This problem is overcome by cutting the inlet hole or outlet hole and gluing or otherwise securing a previously drilled and tapped piece of metal on the interior tub wall (that is by reaching through the inlet hole from the inside of the tub and sticking the metal piece on the other side of the tub wall) and using that metal as a securing point for the inlet or outlet mounting screws or fasteners.

Figure 8:
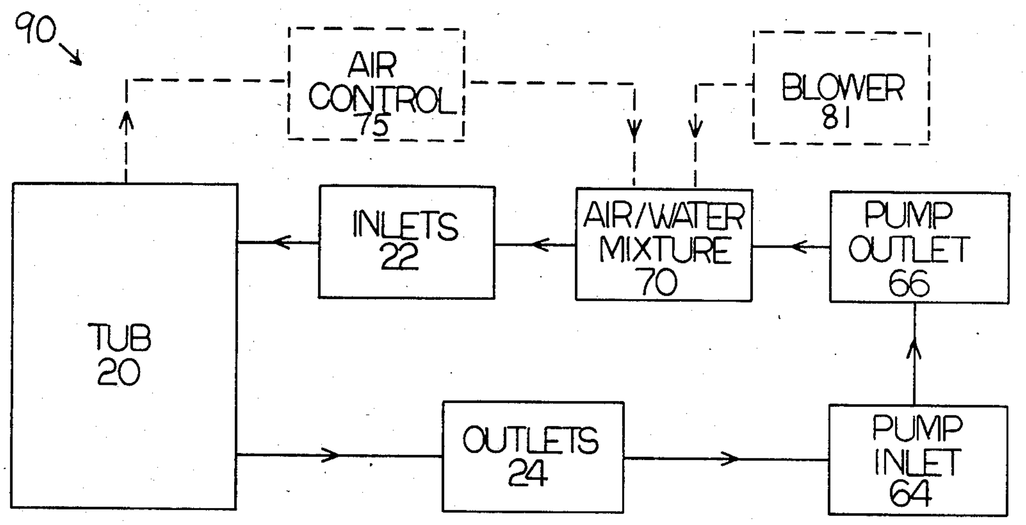
FIG. 8 is a block diagram 90 of the whirlpool bath 10.

Referring now to FIGS. 1 and 8, it may be seen that the operation of this particular whirlpool bath is achieved by filling the tub and turning on pump assembly 60. Water proceeds through outlet channel 45 in outlet 24 to pump inlet 64 and into the pump 62. Pump 62 forces water up and out of the pump outlet 66 into the divider outlet 68. From divider outlet 68, the water is mixed with air at venturi 70 by a standard connection either to an air blower, air intake or other suitable device. The air is supplied through the air intake 74 which feeds directly into venturi 70. This venturi 70 is connected to a substantial length of flexible inlet pipe 22 which runs to jet inlet 30 and is connected therewith. Jet inlet 30 is of course mounted from the inside of the tub 20 through the inlet mounts 41. Thus, the flexible inlet pipe 22 may be run to the inlet mounts 41 and secured thereto while the inlet mounts are mounted to the inside of the tub 20. Water then exits the tub 20 and goes back to pump 62 through outlet 30.

A special function of the air intake 74 and the venturies mounted adjacent to the pump on the outlet divider achieves the same purpose of the standard whirlpool. The use of flexible pipe 22 and 24 whether for inlet or outlet purposes permits installation in an in-place tub especially when combined with the mounting means for the jet inlet 30 and the outlet cap 42. In this fashion, a desirable means of installing a whirlpool bath in an in-place tub while at the same time keeping the cost down and avoiding the expense of the standard installation, desirable results are acheived by the whirlpool for less expense. By providing this great physical benefit at such lesser expense, great advantages are achieved.

The parts making up this invention are standard parts and readily available on the market. An operable pump is made by Sta-Rite Company, American Products, or similar companies. The venturi, and the inlets and outlets are made by Hydro Air, Incorporated. Equivalent parts may also be substituted.

Likewise the methods of connecting various parts together may be varied so long as the joints between the various parts do not leak. Thus, thus parts may be glued, joined by threaded fasteners, or secured in other fashion. As is known in the plumbing art, parts may be made of metal, plastic, synthetic resin or equivalent material. Such material change is well within the scope of this invention so long as the structural and method requirements can be met.

Other Pipe Use

When rigid or partially flexible pipe is used, the in-place installation method of this invention may still be used. The rigid or partially flexible pipe is especially useful if access can be had at both ends of the tub. With such access, the rigid or partially flexible pipe may have a ninety degree joint or a forty-five degree joint affixed thereto in a standard fashion. The inlets or outlets can then be affixed to the other end of the ninety or forty-five degree joint in a standard fashion—such as by gluing. Similarly, the pump end of the pipe may be connected thereto in a standard fashion. Thus rigid or partially flexible pipe may also be used.

Due the disclosure herein, various equivalents can become clear to a person having ordinary skill in this art. Such equivalents are clearly covered hereby.

What is claimed and sought to be secured by Letters Patent of the United States is:

1. In a method for installing a whirlpool assembly in a previously installed porcelain tub wherein said tub has an inner wall and an outer wall, the improvement comprising:

(a) providing a pump assembly, at least one flexible inlet pipe, at least one flexible outlet pipe, at least one inlet means, and at least on outlet means;
(b) providing a mounting flange on said inlet means and said outlet means;
(c) securing said flexible inlet pipe to said inlet means, and said flexible outlet pipe to said outlet means;
(d) using said inlet means to mark at least one spot for forming an insert in said tub;
(e) cutting said spot to permit insertion of said inlet means, wherein said cutting is for a porcelain tub, and cutting said spot for said inlet means and said outlet means includes:
    (1) drilling a centrally located aperture within said spot with a masonry drill bit having a diameter substantially smaller that the diameter of said spot;
    (2) drilling a plurality of small recesses with said masonry drill bit in said tub around said centrally located aperture and substantially tangential to the edge of and interior to said spot;
    (3) cutting said spot to permit insertion of said inlet means;
    (4) tapping a screw hole on either side of said spot; and
    (5) securing said inlet means in said tub by means of screws through said flange into said screw hole;
(f) passing said pipe between said inner wall and said outer wall to said pump assembly, and securing said inlet pipe to said pump assembly;
(g) installing said outlet means in a fashion similar to said inlet means; and
(h) securing an end of said outlet means in an operative fashion to said pump assembly.

2. In a method for installing a whirlpool assembly in a previously installed fiberglass tub wherein said tub has an inner wall and an outer wall, the improvement comprising:

(a) providing a pump assembly, at least one flexible inlet pipe, at least one flexible outlet pipe, at least on inlet means, and at least on outlet means;

(b) providing a mounting flange on said inlet means and said outlet means;

(c) securing said flexible inlet pipe to said inlet means, and said flexible outlet pipe to said outlet means;

(d) using said inlet means to mark at least one spot on said fiberglass tube for forming an insert in said tub;

(e) cutting said spot to permit insertion of said inlet means, wherein cutting said spot for said inlet means and said outlet means includes:

(1) drilling a centrally located aperture within said spot with a masonry drill bit having a diameter substantially smaller that the diameter of said spot;

(2) cutting said spot on said inner wall to permit insertion of said inlet means;

(3) securing two metal plates adjacent said spot on a side of said inner wall adjacent to said outer wall;

(4) tapping a screw hole on either side of said spot; and (5) securing said inlet means in said tub by means of screws through said flange into said screw hole and said metal plate;

(f) passing said pipe between said inner wall and said outer wall to said pump assembly, and securing said inlet pipe to said pump assembly;

(g) installing said outlet means in a fashion similar to said inlet means; and (h) securing an end of said outlet in an operative fashion to said pump assembly.

* * * * *